Patented Aug. 17, 1954

2,686,749

UNITED STATES PATENT OFFICE 2,686,749

PROCESS FOR PURIFYING NEOMYCIN

Herbert L. Wehrmeister, Terre Haute, Ind., assignor to Commercial Solvents Corporation, Terre Haute, Ind., a corporation of Maryland No Drawing. Application December 5, 1950, Serial No. 199,347

8 Claims. (Cl. 167—65)

My invention relates to a method for the purification of neomycin and more particularly it relates to a process for the recovery of purified neomycin from impure aqueous solutions thereof.

Neomycin, a recent addition to the list of antibiotic substances, was first reported by Waksman and Le Chevalier in March, 1949 (Science, vol. 109, page 305). It is active against many gram-positive and gram-negative bacteria. Neomycin has an antibiotic spectrum somewhat similar to streptomycin but is active against many streptomycin-resistant strains of bacteria including *M. tuberculosis*.

Neomycin is produced by a soil organism of the Streptomyces species similar to *Streptomyces fradiae* when grown in nutrient media. The neomycin thus produced is a thermostable, basic compound which is soluble in water. Because of its alkaline nature, neomycin is usually used in the form of its neutral salts, such as for example, neomycin sulfate.

In the past, neomycin has been recovered from the culture media in which it has been produced by a variety of processes, however, the majority of these processes produce neomycin of a low purity. It therefore has become necessary to find a method for the further purification of neomycin already recovered in an impure form from the culture media in which it has been produced.

I have now discovered a process for purifying neomycin which consists primarily in forming an intermediate salt of neomycin with anthraquinone-β-sulfonic acid and subsequently cleaving the neomycin anthraquinone-β-sulfonate with a strong acid which forms a neutral or acid salt of neomycin of high potency. By thus employing my new process, I am able to take recovered neomycin of a low order of purity, containing at least about 50 units per milligram, the neomycin unit as defined by Waksman being the minimum amount of neomycin that will completely inhibit the growth of *Escherichia coli* ATCC 9637 in one ml. of nutrient agar, and raise the potency to a value in excess of about 200 units per milligram thus largely eliminating toxic components of the impure neomycin and rendering it suitable for therapeutic use.

As I have previously mentioned above, the first step of my process consists of forming and isolating the salt, neomycin anthraquinone-β-sulfonate. Since neomycin is a base, it will react with anthraquinone-β-sulfonic acid to form the salt very readily. However the anthraquinone-β-sulfonic acid is most readily available in the form of its sodium salt and therefore I react the neomycin with sodium anthraquinone-β-sulfonate in the presence of an acid strong enough to displace the anthraquinone-β-sulfonic acid from the salt form. Strong mineral acids such as sulfuric, hydrochloric, and nitric acid are particularly suitable for this phase of my process and can be employed with equal effectiveness with other alkali metal or alkaline earth metal salts of anthraquinone-β-sulfonic acid if such salts are more readily available than the usual sodium salt.

In carrying out this step of my process, I employ at least one equivalent weight of anthraquinone-β-sulfonic acid, or the alkali or alkaline earth metal salts, such as the sodium salt, as the case may be, per equivalent weight of the basic reactive groups of neomycin. When an alkali or alkaline earth metal salt such as the sodium salt of anthraquinone-β-sulfonic acid is employed, I add one equivalent weight of the strong acid, as mentioned above. I have found that when enough acid is added so that the pH is lowered to about 5.0 and below, about one equivalent of the strong acid has been added resulting in the ionization of the anthraquinone-β-sulfonic acid and the cation component of the salt employed. Upon carrying out this reaction neomycin anthraquinone-β-sulfonate precipitates from the reaction mixture and the precipitate may be collected in any suitable manner such as for example by filtration.

Neomycin anthraquinone-β-sulfonate is a yellow needle-like crystalline material which is recrystallizable from a suitable solvent such as a water and alcohol mixture. Neomycin anthraquinone-β-sulfonate is optically active and, generally, has a neomycin activity of from about 75 to about 95 units per milligram.

Following the preparation and isolation of neomycin anthraquinone-β-sulfonate, the next step in my new process is to cleave the anthraquinone-β-sulfonic acid radical from the neomycin component of the salt by dissolving the crystalline neomycin anthraquinone-β-sulfonate in an aqueous solution of a strong mineral acid such as for example sulfuric acid, hydrochloric acid, etc. The result of this cleavage is to form a salt of neomycin with the anion of the particular acid employed. Here again I employ one equivalent weight of the acid per equivalent of the neomycin anthraquinone-β-sulfonate and I prefer to use an excess of the acid in order to insure substantially complete replacement of the anthraquinone-β-sulfonic acid component of the neomycin anthraquinone-β-sulfonate and, in turn, subsequent substantially complete precipitation of the salt of neomycin with the anion of the acid used. The new salt which is formed may be a neutral or an acid salt depending upon the acid used. For example, neomycin acid sulfate is formed when sulfuric acid is employed to cleave the neomycin anthraquinone-β-sulfonate.

The neomycin salt or acid salt, such as neomycin acid sulfate, obtained as above described, is next precipitated from the acid solution by the addition of a water soluble lower aliphatic alcohol until substantially all of the neomycin salt or acid salt is precipitated. Generally, I prefer to use about 8 to 10 volumes of alcohol per volume of aqueous acid solution containing the neomycin salt or acid salt in order to insure substantially complete precipitation of the neomycin salt or acid salt, which is then recovered by filtration or any other suitable means. If the precipitated neomycin salt is a neutral salt it may be recovered and dried without further processing. However, if the precipitated salt is an acid salt, such as, for example, neomycin acid sulfate, it must be neutralized before it can be used therapeutically.

The recovered neomycin acid salt is dissolved in water preferably to a concentration of approximately 20,000 units of neomycin per ml. of water. This concentration is such that the last drying step in my process does not require the removal of exceptionally large amounts of water. The aqueous solution of the neomycin acid salt is then neutralized by adding to said aqueous solution a base which forms an insoluble precipitate with the excess acid sulfate such as an alkaline earth metal hydroxide. In carrying out the neutralization steps, the alkaline earth metal hydroxide is added until the pH of the mixture reaches 7. The neutralization can as well be carried out by passing the neomycin acid salt through a strong basic anion exchange resin converting the acid salt to the free neomycin base. The pH of the free neomycin base is then adjusted to 7.0 with a strong mineral acid, preferably sulfuric acid, to obtain the neutral neomycin salt solution. In carrying out my process I prefer to cleave the neomycin anthraquinone-$\beta$-sulfonate with sulfuric acid and subsequently precipitate neomycin acid sulfate which I then prefer to neutralize with calcium hydroxide. When a different acid salt is precipitated it is, of course, necessary to use a base which forms an insoluble salt with the acid and which does not react with or otherwise harmfully affect the neomycin or salt thereof under the conditions of use. When the neomycin acid salt has been neutralized by any of the methods shown above, the remaining liquid is an aqueous solution of a neomycin neutral salt from which the neomycin neutral salt is readily recovered. The water can be removed from this solution by any suitable means such as by spray drying or by vaporization of the water under vacuum while in the frozen state, or the neomycin neutral salt can be precipitated by adding a water soluble lower aliphatic alcohol to the aqueous solution.

The following examples are offered to illustrate my invention but the invention is not to be considered as limited to the examples as shown. The scope of my invention is defined by this specification and the attached claims and obvious equivalents of the materials and operations shown are to be considered as lying within my disclosure.

Example I

A 1559 ml. portion of an aqueous solution of impure neomycin containing 21,900 units of neomycin per ml. (total of 34 million units) was added with stirring to a solution of 457 grams of sodium anthraquinone-$\beta$-sulfonate in 14.5 liters of water and the pH of the resulting solution was adjusted to 3.0 with hydrochloric acid. A precipitate formed and was filtered, washed with water and recrystallized from aqueous ethanol to yield 427 grams of neomycin anthraquinone-$\beta$-sulfonate containing 76 units of neomycin per milligram (total of 32.5 million units). The neomycin anthraquinone-$\beta$-sulfonate was dissolved in 4700 ml. of water with 352 ml. of concentrated sulfuric acid and this solution poured into 47,000 ml. of methanol. Precipitated neomycin acid sulfate weighing 146 gms. was filtered and found to contain 176 units of neomycin per milligram (total of 27 million units). The neomycin acid sulfate was then dissolved in water and the solution passed through a column containing a strong basic, anion-type, ion-exchange resin to obtain the neomycin free base. The resin is a high molecular, water-insoluble, quaternary ammonium hydroxide. The resin is sold under the trade name of Amberlite XE-75 by the Rohm and Haas Company. The pH of the solution of neomycin free base was then adjusted to 7.0 with sulfuric acid and the neutral solution was then freeze dried under vacuum to yield 104 gms. of neomycin sulfate containing 214 units of neomycin per milligram (total of 22.25 million units).

Example II

An 1800 ml. portion of an aqueous solution of impure neomycin containing 18,400 units of neomycin per ml. (total of 33 million units) was added with stirring to a solution of 457 grams of sodium anthraquinone-$\beta$-sulfonate in 14.5 liters of water and the pH adjusted to 3.0 with hydrochloric acid. A precipitate formed and this was filtered, washed with water and recrystallized from aqueous ethanol to yield 366 gms. of neomycin anthraquinone-$\beta$-sulfonate containing 81 units of neomycin per milligram (total of 30 million units). The neomycin anthraquinone-$\beta$-sulfonate was dissolved in 3900 ml. of water with 291 ml. of concentrated sulfuric acid and this solution poured into 39,000 ml. of methanol. Precipitated neomycin acid sulfate weighing 138 gms. was filtered and found to contain 181 units per milligram (total of 25 million units). A 93 gram portion of this neomycin acid sulfate was then dissolved in water and neutralized by adjusting the pH to 7.0 with calcium hydroxide. The precipitate which formed was removed and the remaining solution freeze dried under vacuum to yield 65 grams of neutral neomycin sulfate containing 218 units of neomycin per milligram.

Now having disclosed my invention what I claim is:

1. A process for purifying neomycin produced by culturing Streptomyces fradiae on liquid nutrient media which comprises mixing an impure aqueous solution of neomycin with an aqueous solution of anthraquinone-$\beta$-sulfonic acid, collecting precipitated neomycin anthraquinone-$\beta$-sulfonate, dissolving the neomycin anthraquinone-$\beta$-sulfonate in an aqueous solution of a mineral acid selected from the group consisting of sulfuric, hydrochloric, and nitric acid, adding the resulting solution to a water miscible lower aliphatic alcohol, and collecting the precipitated neomycin salt which forms.

2. A process for purifying neomycin produced by culturing Streptomyces fradiae on liquid nutrient media which comprises mixing one equivalent of the basic reactive groups of neomycin with one equivalent of sodium anthraquinone-$\beta$-sulfonate, adjusting the pH to below about 5.0 with hydrochloric acid, collecting precipitated neomycin anthraquinone-$\beta$-sulfonate, recrystallizing neomycin anthraquinone-$\beta$-sulfonate, dissolving one equivalent of neomycin anthraquinone-β-sulfonate in an aqueous solution of one equivalent of sulfuric acid, adding the resulting solution to methanol, collecting precipitated neomycin acid sulfate, dissolving neomycin acid sulfate in water, neutralizing the aqueous solution of neomycin acid sulfate with calcium hydroxide, removing precipitated calcium sulfate and subsequently drying the remaining solution from the frozen state and recovering dry solid neomycin sulfate.

3. A process for the purification of neomycin produced by culturing Streptomyces fradiae on liquid nutrient media which comprises mixing an aqueous solution of one equivalent of the basic reactive groups of neomycin with one equivalent of anthraquinone-β-sulfonic acid, collecting precipitated neomycin anthraquinone-β-sulfonate, dissolving one equivalent of neomycin anthraquinone-β-sulfonate in an aqueous solution of one equivalent of sulfuric acid, adding the resulting solution to methanol, collecting precipitated neomycin acid sulfate, dissolving neomycin acid sulfate in water, passing the aqueous solution of neomycin acid sulfate through a strongly basic anion exchange resin, adjusting the pH of said solution to 7.0 with sulfuric acid, adding methanol to said solution and recovering precipitated neomycin sulfate which forms.

4. A process for purifying neomycin produced by culturing Streptomyces fradiae on liquid nutrient media which comprises mixing an impure aqueous solution of the said neomycin with an aqueous solution of an alkali metal salt of anthraquinone-β-sulfonic acid, collecting precipitated neomycin anthraquinone-β-sulfonate, dissolving the neomycin anthraquinone-β-sulfonate in an aqueous solution of a mineral acid selected from a group consisting of sulfuric, hydrochloric, and nitric acid, adding the resulting solution to a water miscible lower aliphatic alcohol, and collecting the precipitated neomycin salt which forms.

5. A process for purifying neomycin produced by culturing Streptomyces fradiae on liquid nutrient media which comprises mixing one equivalent weight of an alkali metal salt of anthraquinone-β-sulfonic acid with one equivalent weight of the basic reactive groups of said aqueous neomycin in impure form, adjusting the pH to below about 5.0 with a strong mineral acid selected from the group consisting of sulfuric, hydrochloric, and nitric acid, collecting the precipitated neomycin anthraquinone-β-sulfonate, dissolving one equivalent weight of the neomycin anthraquinone-β-sulfonate in an aqueous solution of at least one equivalent weight of a mineral acid selected from the group consisting of sulfuric, hydrochloric, and nitric acid, adding the resulting solution to a water miscible lower aliphatic alcohol, and collecting the precipitated neomycin salt which forms.

6. The process of claim 5 wherein the alkali metal salt of anthraquinone-β-sulfonic acid is sodium anthraquinone-β-sulfonate.

7. The process of claim 5 wherein the strong mineral acid used to adjust the pH to below about 5.0 is hydrochloric acid.

8. A process for purifying neomycin produced by culturing Streptomyces fradiae on liquid nutrient media which comprises mixing one equivalent weight of the basic reactive groups of the said aqueous neomycin in impure form with one equivalent weight of an alkali metal salt of anthraquinone-β-sulfonic acid, adjusting the pH to below about 5.0 with hydrochloric acid, collecting precipitated neomycin anthraquinone-β-sulfonate, dissolving one equivalent weight of anthraquinone-β-sulfonate in an aqueous solution of at least one equivalent weight of sulfuric acid, mixing the resulting solution with methanol, collecting precipitated neomycin acid sulfate, neutralizing the neomycin acid sulfate, and recovering the neomycin sulfate therefrom.

References Cited in the file of this patent

UNITED STATES PATENTS

| Number | Name | Date |
|---|---|---|
| 2,462,175 | Folkers | Feb. 22, 1949 |
| 2,501,014 | Wintersteiner et al. | Mar. 21, 1950 |
| 2,516,080 | Sobin et al. | July 18, 1950 |
| 2,537,934 | Lott | Jan. 9, 1951 |

OTHER REFERENCES

Swart et al., article in Archives of Biochem., Nov. 1949, vol. 24, pages 92–103.

Peterson et al., article in J. A. C. S., vol. 72, published 1950, pages 3598–3603.

Peck, letter in J. A. C. S., pages 2590 and 2591, July 2949.

Barron, "Handbook of Antibiotics." pages 171–174, published 1950, Reinhold Publishing Co., N. Y. C.